(No Model.)

R. T. PHILLIPS.
CLOD CRUSHER.

No. 540,872. Patented June 11, 1895.

Witnesses.
A. Ruppert.
Jno. A. Richards

Inventor:
R. T. Phillips
Per
Thomas P. Simpson
Atty.

UNITED STATES PATENT OFFICE.

ROBERT T. PHILLIPS, OF LYNCHBURG, VIRGINIA.

CLOD-CRUSHER.

SPECIFICATION forming part of Letters Patent No. 540,872, dated June 11, 1895.

Application filed March 26, 1894. Serial No. 505,218. (No model.)

*To all whom it may concern:*

Be it known that I, ROBERT T. PHILLIPS, a citizen of the United States, residing at Lynchburg, in the county of Campbell and State of Virginia, have invented a new and successful clod cutting, breaking, and pressing roller followed by a spring-tooth rake, the whole of which is known as a Clod-Crusher, of which the following is a specification.

The special object of the invention is to break and crush clods in preparing land to grow crops.

Figure 1:
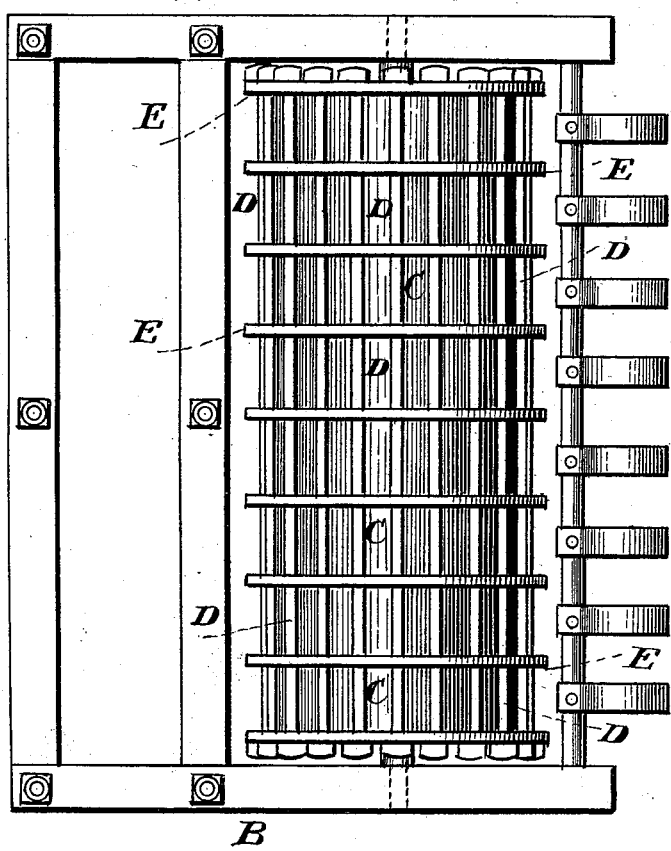
Figure 2:
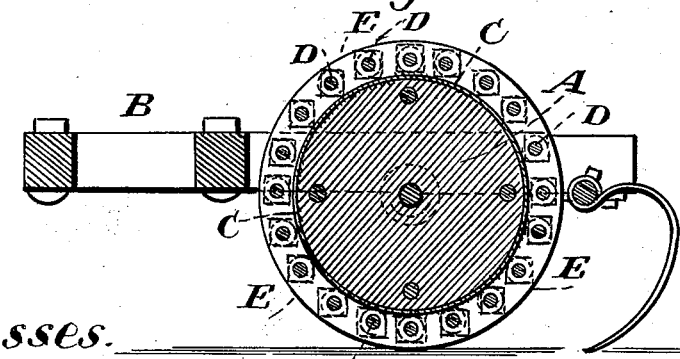

Figure 1 of the drawings is a plan view, and Fig. 2 a sectional elevation.

In the drawings, A represents a land roller made up of several smaller rollers or sections and journaled in a frame B in the usual way. The roller sections are secured together by four or more bolts as shown in Fig. 2 of the drawings while at the ends and between the sections are arranged flat metallic rings E. Through these rings I pass the bolts D longitudinally of the roller, the outer part of the rings being extended above the surface of the roller, and the ends of the bolts upset or provided with nuts. In this way, I form an implement which may be used upon plowed ground with great effect to crush and break up the clods because the rings or annular blades divide the clods into fragments which are then crushed by the weight of the roller, the longitudinal bolts D serving as an auxiliary in subdividing the clods.

Having thus described all that is necessary to a full understanding of my invention, what I claim as new, and desire to protect by Letters Patent, is—

A clod crusher consisting of wooden rolls held together by bolts, intermediate and terminal disks of larger diameter than the roller sections and forming annular blades at intervals, and transverse rods passing through said blades outside of the periphery of said roller sections, all substantially as shown and described.

ROBERT T. PHILLIPS.

Witnesses:
WM. V. WILSON, Jr.,
N. C. MANSON, Jr.